March 15, 1960   H. S. VAN BUREN, JR   2,928,445
NUT WITH ELASTIC SEALING AND LOCKING MEMBER
Filed Oct. 18, 1956
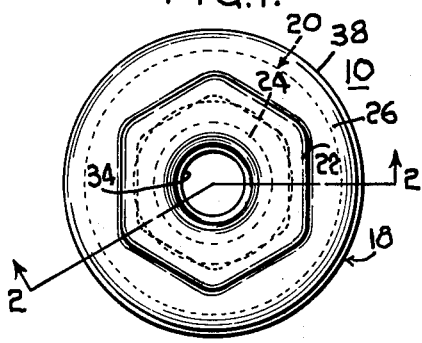
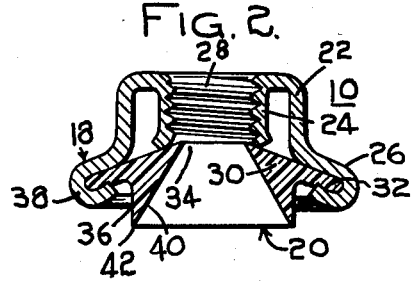
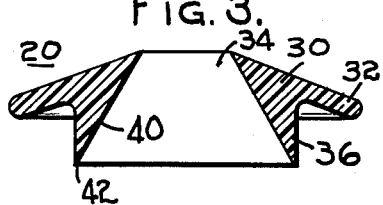
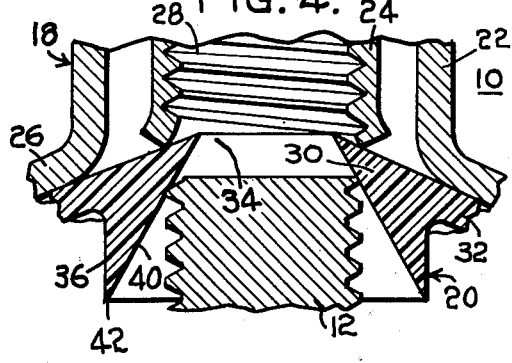
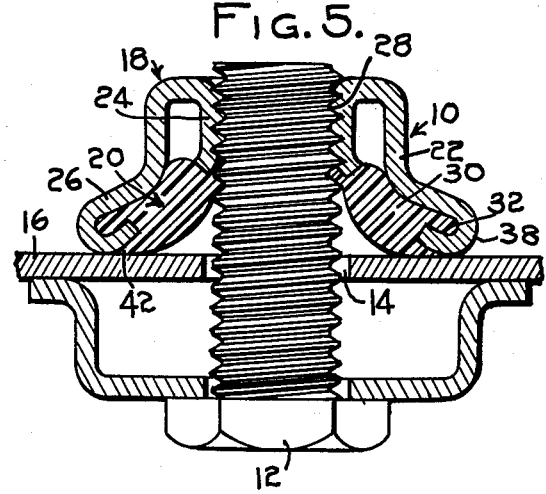
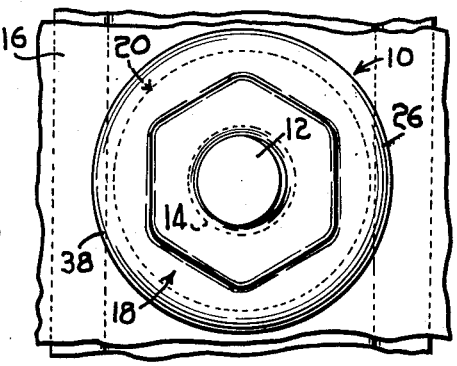
INVENTOR:
HAROLD S. VAN BUREN JR.,
BY Robert E Ross
ATTORNEY.

United States Patent Office

2,928,445
Patented Mar. 15, 1960

2,928,445

NUT WITH ELASTIC SEALING AND LOCKING MEMBER

Harold S. Van Buren, Jr., Cambridge, Mass., assignor to United-Carr Fastener Corporation, Boston, Mass., a corporation of Delaware Application October 18, 1956, Serial No. 616,735

1 Claim. (Cl. 151—7)

This invention relates generally to fastening devices, and has particular reference to a sealing nut assembly which is adapted to receive a bolt in watertight engagement.

In the construction of automobiles, household appliances, and the like, it is frequently desired to attach a trim molding, a name plate, or the like, to a sheet metal panel, and in many cases it is desirable that such attachment be waterproof to prevent the entrance of moisture and dust to the interior of the device.

Although a number of methods have been proposed to provide a waterproof seal in such an assembly, none have proved entirely satisfactory. Most of the devices in use utilize a mastic sealing compound in the nut. However, it has been found that such devices do not provide an absolutely watertight seal about the threads of the bolt, are difficult to handle, and are expensive to manufacture.

The object of this invention is to provide a sealing nut device in which the sealing portion is adapted for rapid and economical assembly in automatic machinery.

A further object of the invention is to provide a sealing nut assembly in which means is provided to grip tightly about the threads of an inserted bolt and to squeeze between the bolt and the nut to provide a watertight seal therebetween.

A further object of the invention is to provide a sealing nut assembly in which the sealing member also provides a friction lock when the nut is assembled into a bolt.

Other objects of the invention will be obvious to one skilled in the art from the following description of a specific embodiment thereof.

In the drawing:

Fig. 1 is a top plan view of a sealing nut assembly embodying the features of the invention;

Fig. 2 is a view in section taken on line 2—2 of Fig. 1;

Fig. 3 is a view of the sealing member prior to assembly with the nut;

Fig. 4 is an enlarged view of a portion of Fig. 2;

Fig. 5 is a view in section of an assembly utilizing the nut of Figs. 1–3; and

Fig. 6 is a top plan view of the assembly of Fig. 5.

Referring to the drawing, there is illustrated a sealing nut assembly 10, which is adapted to engage a bolt 12 protruding through an opening 14 in a supporting panel 16, and to provide a watertight seal about the bolt.

The nut assembly 10 comprises generally a nut 18 and a sealing member 20 assembled therewith. The nut 18 comprises an outer barrel 22 shaped to receive a driving tool such as a wrench, an inner barrel 24 joined to the outer barrel at one end, and an outwardly and downwardly extending flange 26 disposed on the other end of the outer barrel. The inner barrel 24 has a central aperture 28 threaded to receive the bolt 12.

The sealing member 20 is formed of a single piece of resilient deformable material, such as synthetic organic plastic, for example, polyethylene, and comprises a body portion 30 which has a relatively thin peripheral flange 32, a central opening 34, and a downwardly projecting peripheral wall 36 disposed about the opening.

To retain the sealing member 20 in assembly with the nut 18, the outer periphery 38 of the flange 26 is curled inwardly under the periphery of the flange 32 of the sealing member. The opening 34 has a diameter less than that of the threaded aperture 28 of the nut, and to facilitate insertion of the bolt 12 into the nut, the inner surface 40 of the wall 36 is inclined outwardly, so that the opening 34 is enlarged toward the lower side of the sealing member. The outward inclination of the inner surface 40 also results in a relatively thin lower end 42.

As illustrated in Fig. 5, when the nut is assembled into the bolt 12, the opening 34 enlarges to permit the bolt to pass into the threaded aperture, and thereafter grips the bolt tightly to provide both a watertight seal about the threads and also provides a friction lock between the nut and the bolt.

As the nut is tightened against the panel 16 the thin lower end 42 of the wall 36 engages the panel, and the lower portion of the wall spreads outwardly under the flange of the nut, providing a watertight seal between the flange and the panel, and also provides a friction lock therebetween.

The nut assembly illustrated herein has been found to provide an absolutely watertight seal about a bolt onto which it is assembled, and is economical to manufacture, since the sealing device is readily adapted for assembly into the nut in automatic machines. The assembly is also easily handled without the danger of the parts striking together as is frequently the case with parts which utilize a mastic compound as the sealing agent.

Since certain obvious changes may be made in the device without departing from the scope of the invention, it is intended that all matter contained herein be interpreted in an illustrative and not in a limiting sense.

I claim:

A sealing nut device comprising a nut having an outer barrel portion shaped to receive a driving tool, an inner barrel portion disposed within said outer barrel in spaced, substantially parallel relation therewith and secured thereto at one end thereof, the inner surface of said inner barrel portion being threaded forming an axially extending threaded central bore in the nut for receiving a threaded bolt therein, the lower end of said inner surface being outwardly flared, an outwardly and downwardly extending flange portion joined to the lower end of said outer barrel portion and lying below said inner barrel portion, the outer end of said flange portion having a reverse bend portion extending inwardly in the direction of said outer barrel portion forming a circumferentially extending recess therein, and a flexible sealing member formed from a single portion of resilient material assembled with said nut, said sealing member including a circumferential body portion having an axially extending aperture decreasing in cross section from bottom to top thereof formed therein, the inner surface formed by said aperture in said body portion extending generally radially upwardly and inwardly from the bottom edge of said body portion and converging at the top of said aperture, and a circumferential wing portion extending outwardly and downwardly from the top perimetral edge of said aperture and extending beyond the outer circumference of said body portion, said wing portion positioned within the formed recess in said flange portion of said nut member, said aperture in said body portion forming a thin-walled, flexible bottom portion at the bottom of said body portion and a thin-walled, flexible top portion at the top of said body portion, the diameter of the aperture in said body portion at the top thin-walled end being less than the diameter of said inner bore with said top thin-walled flexible portion at the top of said aperture being sufficiently flexible for engagement in said flared surface between threads of the inner barrel portion at its lower free end thereof and the threads of an inserted bolt and the thin-walled, bottom flexible portion of the bottom end of said base portion being deformable against a support when the nut assembly is threaded onto a bolt thereby providing a seal between the nut assembly and the support.

References Cited in the file of this patent

UNITED STATES PATENTS

| | | |
|---|---|---|
| 131,945 | Dunlap | Oct. 8, 1872 |
| 1,208,620 | Moser | Dec. 12, 1916 |
| 1,393,459 | Smith | Oct. 11, 1921 |
| 2,706,656 | Roubal | Apr. 19, 1955 |
| 2,761,349 | Heller | Sept. 4, 1956 |

FOREIGN PATENTS

| | | |
|---|---|---|
| 123,346 | Australia | Jan. 17, 1947 |